United States Patent [19]
Forrest et al.

[11] Patent Number: 5,287,421
[45] Date of Patent: Feb. 15, 1994

[54] ALL-OPTICAL MODULATION IN CRYSTALLINE ORGANIC SEMICONDUCTOR WAVEGUIDES

[75] Inventors: Stephen R. Forrest, Princeton, N.J.; De Yu Zang, Irvine, Calif.

[73] Assignee: University of Southern California, Los Angeles, Calif.

[21] Appl. No.: 3,021

[22] Filed: Jan. 11, 1993

[51] Int. Cl.$^5$ ............................................... G02B 6/02
[52] U.S. Cl. ........................................ 385/5; 385/129
[58] Field of Search ................ 385/2, 3, 4, 5, 9, 13, 385/28, 129, 130, 132, 147, 146

[56] References Cited

U.S. PATENT DOCUMENTS

| | | | |
|---|---|---|---|
| 4,932,737 | 6/1990 | Yoon et al. | 385/3 |
| 5,076,655 | 12/1991 | Bridges | 382/2 X |
| 5,079,321 | 1/1992 | Sperling et al. | 385/2 X |
| 5,191,630 | 3/1993 | Tajima | 385/5 X |
| 5,193,130 | 3/1993 | Nishiwaki et al. | 385/2 X |
| 5,202,786 | 4/1993 | Boyle et al. | 385/5 X |
| 5,214,723 | 5/1993 | Zamkotsian | 385/2 |

OTHER PUBLICATIONS

F. F. So et al, "Quasi-epitaxial growth of organic multiple quantum well structures by organic molecular beam deposition", *Applied Physics Letters*, vol. 56 (7), pp. 674-676 (Feb. 12, 1990).

D. Y. Zang et al, "Optical waveguides in crystalline organic semiconductor thin films", in *Applied Physics Letters*, vol. 58 (6), pp. 562-564 (1991).

D. Y. Zang et al, "Giant anisotropies in the dielectric properties of quasi-epitaxial crystallien organic semiconductor thin films", in *Applied Physics Letters*, vol. 59 (7), pp. 823-825 (1991).

D. Y. Zang et al, "All-optical modulation in crystallien organic semiconductor waveguides", in *Applied Physics Letters*, vol. 60 (2), pp. 189-191 (Jan. 13, 1992).

D. Y. Zang et al, "Crystalline Organic Semiconductor Optical Directional Couplers and Switches Usine an Index-Matching Layer", in *IEEE Photonics Technology Letters*, vol. 4, No. 4, pp. 365-368 (Apr. 1992).

*Primary Examiner*—Akm E. Ullah
*Attorney, Agent, or Firm*—Benman & Collins

[57] ABSTRACT

All-optical modulation occurs in crystalline organic semiconductor waveguides (10a) grown by the ultra-high vacuum process of organic molecular-beam deposition onto substrates (10b). Two light beams with wavelengths of 1.06 and 0.514 $\mu$m from a first source (12) and a second source (34), respectively, may be used as the guided and the pump light sources, respectively. A resonant non-linear coefficient at room temperature of $5.4 \times 10^{-5}$ cm$^2$/W at 1.06 $\mu$ occurs at a pump intensity of 1.0 W/cm$^2$. This large non-linear effect is attributed to free electron-hole pairs produced by the dissociation of excitons generated by the short wavelength beam. A carrier lifetime of (17±1) us, which determines the modulator switching time, is in good agreement with theoretical predictions. This appears to be the first observation of free-carrier-induced index modulation in crystalline organic waveguides.

17 Claims, 4 Drawing Sheets

ALL-OPTICAL MODULATION IN CRYSTALLINE ORGANIC SEMICONDUCTOR WAVEGUIDES

TECHNICAL FIELD

The present invention relates to optical modulators, and, more particularly, to optical modulators employing organic semiconductors.

BACKGROUND ART

For more than two decades, organic materials have been investigated for their potential usefulness to non-linear optics (NLO). Most research has been focused on non-resonant non-linear effects, since the losses are smaller and the response times are shorter than at resonance. Resonant NLO effects, however, are interesting because they can be induced at very small optical powers. Resonant NLO effects also clarify the nature of optical transitions and dynamic processes which are not yet completely understood for organic materials. In previous work, the linear dielectric properties of the crystalline organic compound, 3,4,9,10-perylenetetracarboxylic dianhydride (PTCDA) were reported;

see, e.g., D. Y. Zang et. al., *Applied Physics Letters*, Vol. 58, pp. 562-564 (1991). However, no additional work on this compound has been reported as to any non-linear properties it may have.

Non-linear optical properties permit the fabrication of optical devices, such as optical modulators, switches, frequency doublers, etc. A desirable property of such modulators is a large resonant non-linear coefficient, $n_2$, which determines how sensitive the modulator is to the intensity of the incoming radiation, and hence how easily the modulator is switched. In this connection, the non-linear index of refraction is given by the product of $n_2$ and the intensity.

DISCLOSURE OF INVENTION

In accordance with the invention, an improved method of modulating light in at least one waveguide, comprising:
(a) providing at least one waveguide;
(b) introducing light from a first source into the waveguide;
(c) introducing light from a second source at an angle to the waveguide to cause modulation of the light from the first source,
wherein the improvement comprises fabricating the waveguide from a crystalline organic aromatic semiconductor compound having a resonant non-linear coefficient of at least $10^{-6}$ cm$^2$/W at room temperature and grown in an ordered, or quasi-epitaxial, structure.

Using a planar stacking crystalline organic aromatic semiconductor molecular film, such as 3,4,9,10-perylenetetracarboxylic dianhydride (PTCDA), results in a high response to the modulating light. The effect is achieved by modifying the index of refraction of the waveguide, which controls the amount of light being guided. The resonant non-linear coefficient, $n_2$, of PTCDA at room temperature is $5.4 \times 10^{-5}$ cm$^2$/W at 1.06 $\mu$m at a pump intensity of 1.0 W/cm$^2$, which is among the highest values for practical optical device materials.

BEST MODES FOR CARRYING OUT THE INVENTION

Figure 1:
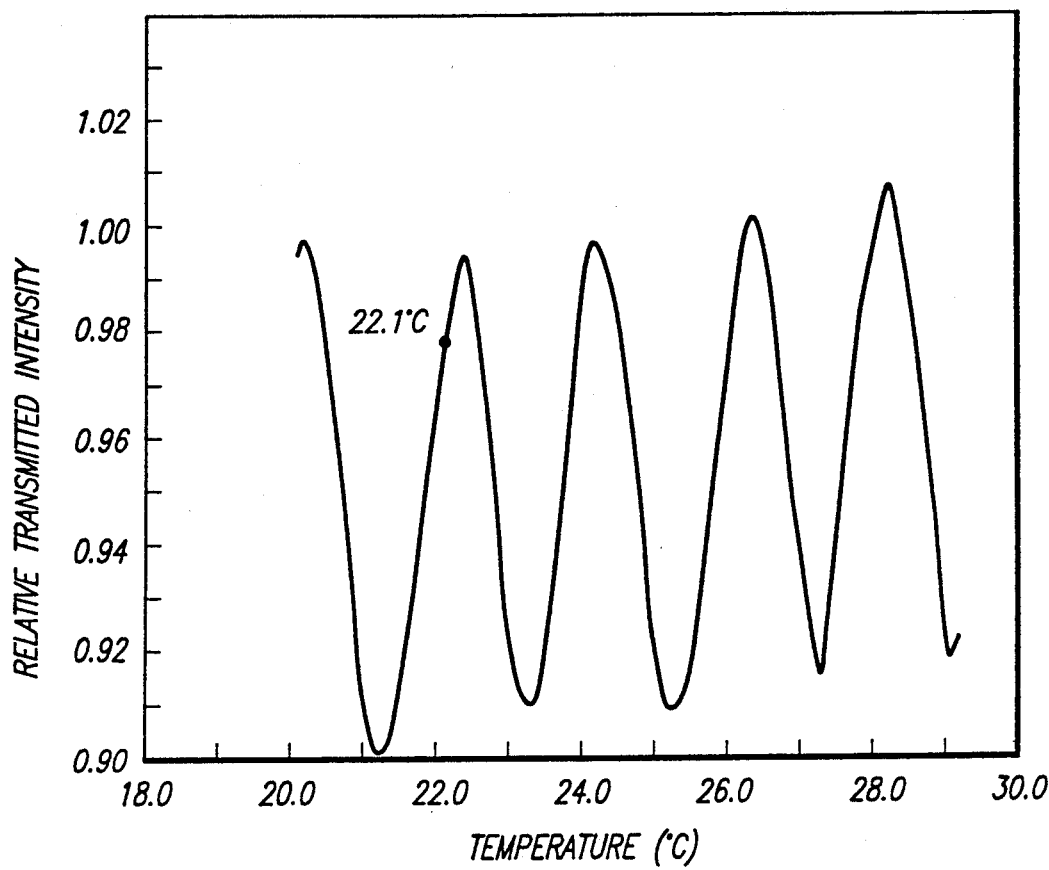
FIG. 1, on coordinates of relative transmitted intensity and temperature in °C., is a plot depicting the temperature-dependent intensity measured in a PTCDA Fabry-Perot waveguide resonator at $\lambda = 1.06$ $\mu$m with a length of 1.62 nm and a width of 2 $\mu$m.

Resonant non-linear optic (NLO) effects are associated with free carriers (plasma) generated by dissociated excitons in rib waveguides comprising a crystalline organic aromatic semiconductor compound. This appears to be the first observation of light-generated plasma effects in organic crystals.

The discussion which follows is given in terms of a crystalline organic aromatic semiconductor compound comprising a particular polyacene, 3,4,9,10-perylenetetracarboxylic dianhydride (PTCDA). However, it will be appreciated by those skilled in this art that other polyacenes having at least two fused benzene rings, as in naphthalene compounds, and preferably four such rings, as in perylene compounds, may be employed in the practice of the invention. Such polyacenes may have one or more substituents, including anhydride(s), phenyl(s), imide(s), and the like.

The polyacenes and their derivatives preferably are in a planar configuration. Such a planar configuration aids in stacking during deposition to form an ordered, or quasi-epitaxial, structure. Deposition is done on a substrate, using organic molecular beam deposition, as is already known in the art.

Charge transport in molecular semiconductors is generally thought to be initiated via excitonic transitions. Here, free electron-hole pairs are generated in a second-order process via dissociation of photogenerated excitons at surfaces or bulk material impurities. That is, given a molecule in ground state S0, a dominant channel for free-carrier production due to absorption of light of energy $\hbar\omega$, is $S_0 + \hbar\omega \rightarrow S^*$, followed by $S^* + M \rightarrow e^- + h^+$. Here, $S^*$ is the excited singlet exciton state of the molecule, M represents an impurity or interface, and $e^-$ and $h^+$ are the free electron and hole, respectively. The absorbed light must have a photon energy greater than the exciton transition energy (typically 1.5 to 3 eV). Since the process is second order, the quantum efficiency ($\eta$) for electron-hole generation is usually $\leq 1\%$. Assuming that there is a refractive index change (Δn) associated with the optical generation of free carriers (via excitons), the Drude model gives $$\Delta n = \frac{-e^2 N}{2nm^*\epsilon_0\omega^2}, \quad (1)$$

where e is the electronic charge, N is the free-carrier density induced by the optical beam, n is the refractive index in the dark, m* is the carrier effective mass, $\epsilon_0$ is the permittivity in vacuum, and ω is the light frequency. A steady-state solution of the continuity equation for N gives $$\Delta n = n_2 I = \frac{-e^2 \alpha \tau \eta I}{2nm^*\epsilon_0 \ \omega^3}. \quad (2)$$

Here, α is the absorption coefficient, I is the optical intensity, τ is the feee-carrier lifetime, and ℏ is Planck's constant divided by 2π. Note that the non-linear coefficient, $n_2$, given by Eqn. (2), is only due to the free-carrier concentration (not the exciton population), and is intensity-dependent.

To fabricate the waveguide devices in which $n_2$ was measured, a 1-μm-thick, AZ 1400 photoresist layer (with $n_p=1.61$) was first spun onto the surface of a cleaned and polished (100) InP substrate. Next, a series of 2-μm-wide strips were patterned onto the photoresist along the (110) direction by conventional photolithographic techniques. A 1-μm-thick crystalline PTCDA layer was then deposited onto both the InP substrate and the photoresist ridges using the ultrahigh vacuum ($\sim 10^{-9}$ Torr) process of organic molecularbeam deposition. Deposition was obtained by heating a prepurified source of PTCDA to 450° C. to achieve a deposition rate of approximately 3 Å/s, while the substrate temperature is maintained at 90K. It has previously been found that thin-film deposition under these conditions results in single-crystalline growth of PTCDA on the photoresist strips into low-loss (<2.5 dB), TE-mode waveguides. To form waveguide facets, the InP substrate was cleaved along the ($\bar{1}$10) direction. The facet surfaces are sufficiently smooth to allow for observation of Fabry-Perot resonances as the index of the guide is thermally or optically varied.

Figure 1A:
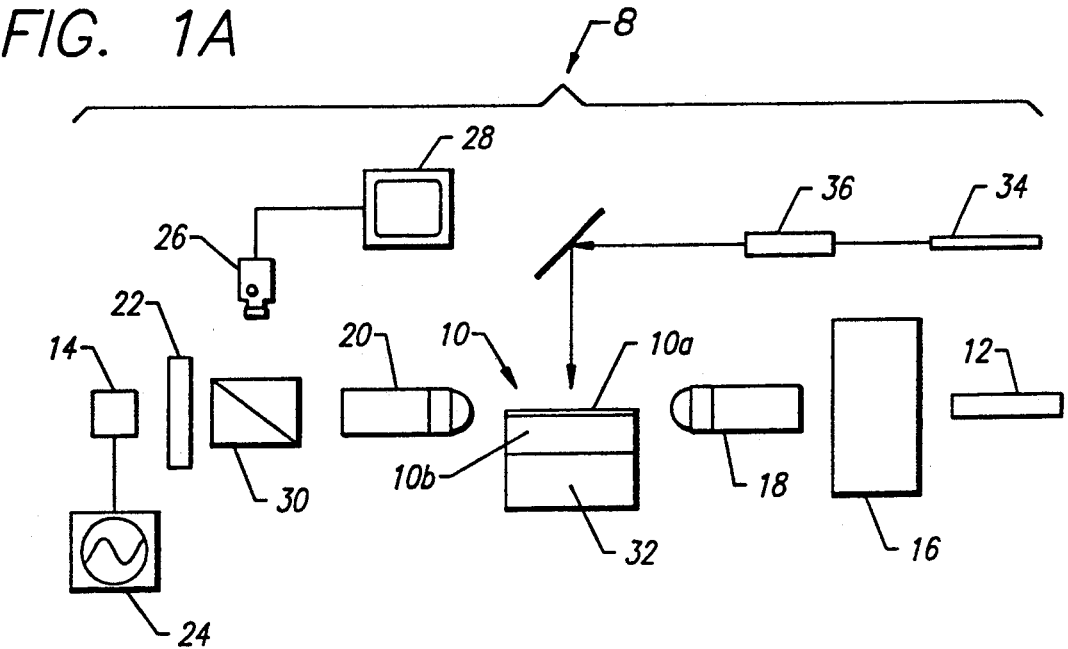
FIG. 1A depicts the experimental arrangement used to generate the data in FIG. 1.

The apparatus used to generate the results discussed herein is depicted in FIG. 1A. The waveguide device 10 comprised a waveguide layer 10a, for example PTCDA, deposited on, for example, an InP substrate 10b with a ridge of, for example, AZ 1400 photoresist. The device 10 was placed between a laser 12 and a detector 14. A diode-pumped YAG ring laser radiating at 1.06 μm wavelength was employed as the laser 12. The linear polarization of the laser 12 was continuously adjustable to any direction by rotating a quarter wave plate (not shown) in the laser head without moving the light spot position. The detector 14 comprised a high-speed $In_{0.53}Ga_{0.47}As$ avalanche photodetector (APD) for detecting the light signal. A Glan-Thompson polarizer 16 having an extinction ratio ~50 dB was placed in front of the laser 12. This set-up provided stable, linearly polarized light power where the polarization angle could be oriented in any direction, and ensured a constant coupling efficiency.

The rotatable, linearly polarized light then was coupled into the waveguide device 10 by lens 18. A second lens 20 imaged light output from the waveguide device 10. The light was then passed through an adjustable iris 22 onto the detector 14. The iris 22 minimized the amount of scattered background light entering the detector 14. The output from the detector 14, here a Si CCD camera, was viewed on an oscilloscope 24.

To ensure a constant coupling efficiency, a TV camera 26 and associated TV monitor 28 monitored the beam spot position using a beam splitter 30 placed in front of the APD 14. The waveguide device 10 was placed on a copper block mounted on a thermoelectric cooler 32. Using a thermocouple and a temperature controller (not shown), the temperature of the waveguide device was controlled to within ±0.05° C.

The 2-μm-wide PTCDA rib waveguide allowed for propagation of a single $TE_{00}$ mode. The waveguide, with its cleaved facets, acts as a glossy Fabry-Perot resonator with a transmission function of $$P(\delta) = \frac{(1-R)^2 e^{-\alpha L}}{(1-Re^{-\alpha L})^2 + 4Re^{-\alpha L}\sin^2(\delta/2)}, \quad (3)$$

where α is the absorption coefficient, L is the device length (1.62 mm), R is the reflection coefficient at the waveguide facets which is calculated to equal 0.11 considering only Fresnel reflections, and δ is the phase shift defined as $\delta = \delta_0 \Delta\delta = (4\pi L/\lambda)(n+\Delta n)$. When the temperature T is varied, the transmitted intensity varied periodically (see FIG. 1), as is characteristic of a Fabry-Perot resonator. A complete fringe (two adjacent maxima) corresponding to a phase difference of $\Delta\delta = 2\pi$ was observed for a temperature change of 2°C., from which is obtained $$(1/n)\Delta n/\Delta T = (8.1 \pm 0.5) \times 10^{-5} \text{ K}^{-1}.$$

Using Eqn. (3), however, a maximum transmission modulation of ~50% was expected, compared to an observed modulation of only 10%. This smaller-than-expected modulation is possibly due to imperfect waveguide facets which lower the finesse of the resonator.

To measure the all-optical modulation characteristics, of the guide, a pump light beam from an argon laser 34 of 0.514-μm wavelength with a diameter L'=1 mm directly illuminated the surface of the PTCDA waveguide 10a, while the 1.06-μm beam from the ring YAG laser 12 was end-fire coupled into the waveguide, as in the case of the Δn/ΔT measurements. An acousto-optic modulator 36 modulated the beam from the argon laser 34.

Figure 2:
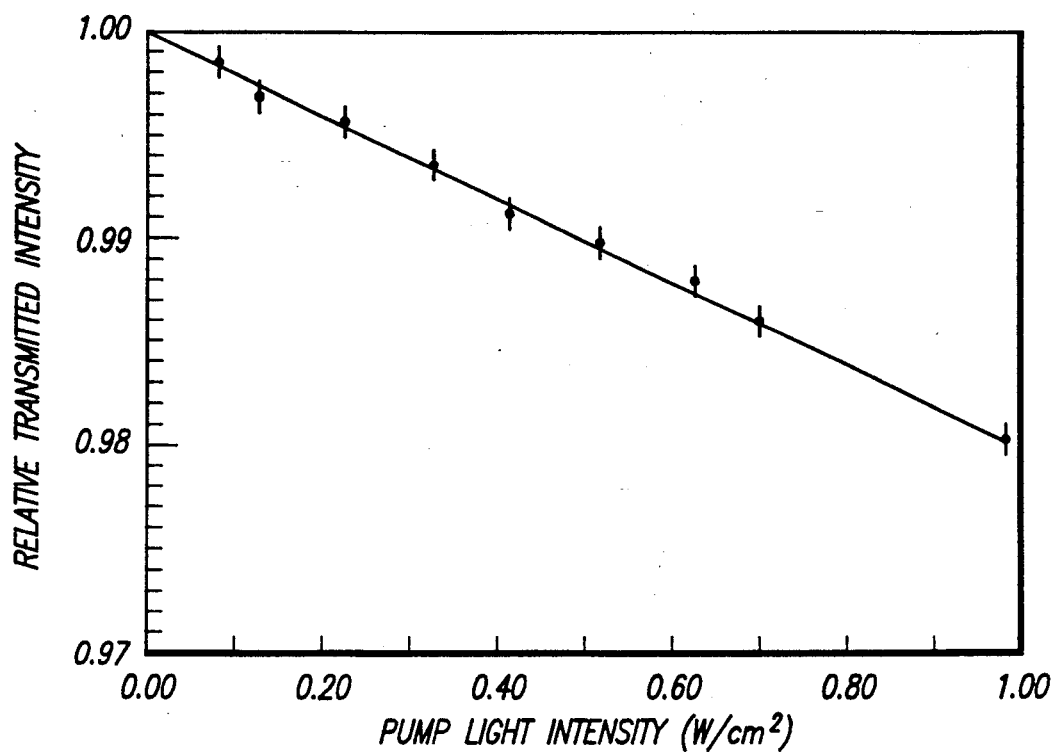
FIG. 2, on coordinates of relative transmitted intensity and pump light intensity in W/cm$^2$, is a plot of the intensity of guided light ($\lambda = 1.06$ $\mu$m) as a function of pump light intensity ($\lambda = 0.514$ $\mu$m) in a PTCDA waveguide with the same parameters as in FIG. 1.

In order to avoid thermally induced intensity changes from the pump, the device temperature was precisely maintained at 22.1° C. using the thermoelectric cooler 32. The pump-induced intensity changes are shown in FIG. 2. Here, the transmitted intensity is decreased nearly linearly proportional to the pump intensity at a temperature of 22.1° C. In contrast, the transmitted intensity due to a temperature rise at 22.1° C. is increased (FIG. 1).

While it is suggested here that the pump power dependence of P(δ) is due to an optically-induced index change, it is nevertheless important to consider other competing processes. The most significant contributions to Δn are thermally-induced index changes and optically-induced absorption effects. To differentiate between these various mechanisms, the modulation behavior at very low pump light intensities (<1 W/cm²) has been investigated over a wide temperature range (16° to 37° C.). Three observations exclude the possibility of thermal effects: First, the changes in transmitted intensity under a constant pump power could either be increased or decreased, depending on temperature. However, the sign of the optically-induced change of transmitted intensity was always opposite to the thermally induced changes over the entire temperature range explored. For instance, at a certain temperature, if the transmitted intensity was decreased due to pump light illumination, it was increased due to a temperature rise. This is similar to observations for inorganic semiconductors in which non-linear effects were attributed to index changes due to excitons.

A further observation ruling out thermal effects is that the temperature increase is calculated to be −0.03° C. under a maximum pump light intensity of 1 W/cm². This calculation assumes a steady-state thermal conductivity of 0.1, 0.007, and 0.8 W/cm K for PTCDA, AZ 1400, and InP, respectively. Such a small temperature rise does not significantly contribute to the intensity modulation, as inferred from FIG. 1. Finally, the transient thermal relaxation time was calculated to be >13 ms, which is three orders of magnitude larger than the measured modulation time of 17 μs, as shown below. A very low amplitude "tail" in the modulation response with a time constant of ∼6 ms was observed at the highest pump intensities. This latter time constant is attributed to be characteristic of very small thermal effects, whereas the shorter time constant results from significantly larger carrier lifetime effects.

The second "parasitic" effect to be considered is pump-induced absorption changes, $\Delta\alpha$. Using Eqn. (3), it can be shown that the change of transmitted light intensity, $\Delta P$, in the limit of $\alpha L<1$, is given by $\Delta P = -A\Delta\alpha$, where A is a constant. Since the waveguide used in this experiment had $\alpha L=0.092$, this expression is valid. Thus, if the optically-induced intensity change is due to $\Delta\alpha$, a constant decrease of the transmitted intensity under a constant pump light illumination should be observed, independent of temperature. However, as noted above, the sign of the observed change varied, dependent on temperature. In addition, the absorption change due to the optically-induced plasma is given by $\Delta\alpha/\Delta n = 2/c\tau$, where $\tau$ is the carrier lifetime and c is the velocity of light. For PTCDA, $\Delta\alpha/\Delta n = 4.2\times10^{-6}$ cm$^{-1}$, and absorption changes are insignificant. It is concluded, therefore, that the modulation change is due to an intensity-dependent refractive index, rather than a change in the absorption coefficient.

Since both the optically- and the thermally-induced modulation are caused by the changes in refractive index, the thermal measurements can be used to determine $\Delta n = n_2 I$. That is, since the thermal measurements indicated that an output intensity change of 10% corresponds to a $\pi$-phase change (FIG. 1), then the 2% decrease in transmitted intensity induced by a pump power of I=0.98 W/cm² corresponds to $\Delta\delta = \pi/5$. Using the relationship $$\Delta\delta = 4\pi(n_2 I)L'/\lambda,$$

one obtains $n_2 = 5.4\times10^{-5}$ cm²/W, where L'=1 mm is the interaction length. Here, 22.1° C. was chosen as the measurement temperature, since the optically-induced intensity change is nearly linear over a small range of pump intensity (<1 W/cm²). Of course, the measurement can be made equally well at other temperatures.

Figure 3:
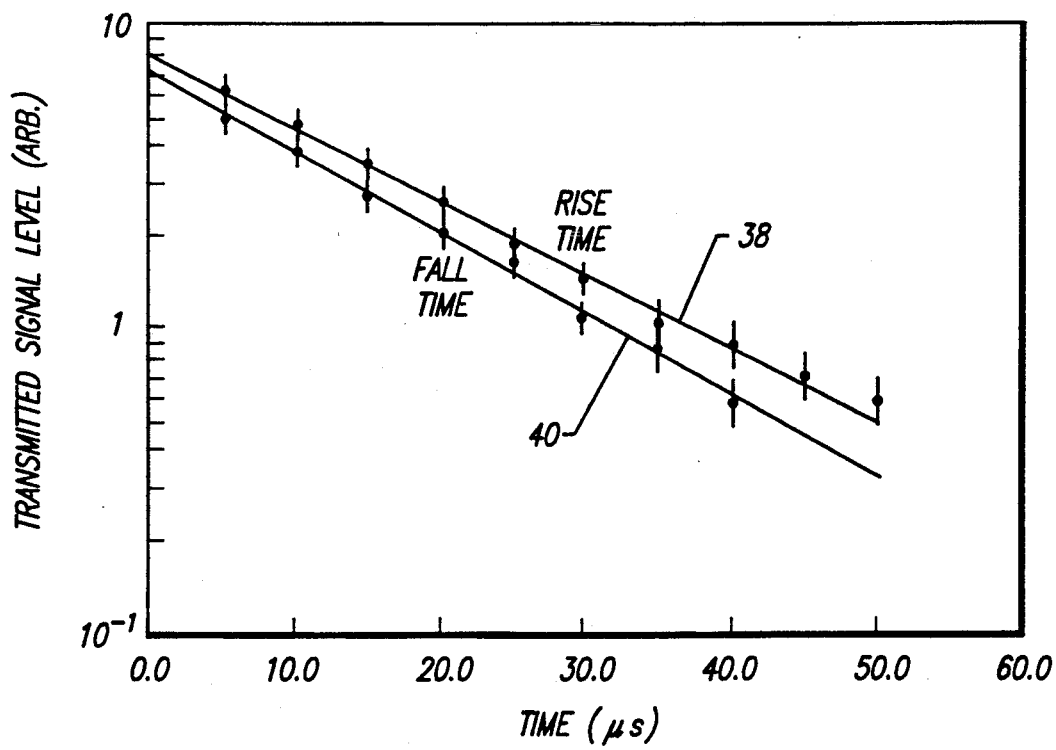
FIG. 3, on coordinates of transmitted signal level in arbitrary units and time in $\mu$s, in a plot of rise and fall times of the 1.06-$\mu$m wavelength beam due to modulation of the $\lambda = 0.514$-$\mu$m beam.

By comparing the measured carrier lifetime to theoretical predictions, it is verified that $n_2$ is indeed due to an optically-generated plasma. Here, $\tau$ was directly measured from the transient response time of the 1.06-μm wavelength beam due to a pulsed 0.514-μm pump beam. Using a measurement system with a response time of <1 μs, the rise and fall times (Curves 38 and 40, respectively) of the 1.06-μm beam were found to be 18 and 16 μs, respectively (FIG. 3). For comparison, from the steady-state measurements of $n_2$, using Eqn. (2), $\tau = (14\pm1)$ is obtained, which is very close to the measurement. The constants used in the calculation for PTCDA are $\alpha = 4.6\times10^5$ cm$^{-1}$ at $\lambda = 0.514$ μm as obtained from absorbance measurements, a hole effective mass for PTCDA of m* = 0.18m$_o$ (where m$_o$ is the electron rest mass), and a quantum efficiency of $\eta = 0.01$. The presence of electrons was ignored, since their effective mass is at least an order of magnitude larger than that of holes. In this case, Eqn. (2) implies that their effect on $\Delta n$ is negligible.

Table I lists the resonant non-linear properties of some typical inorganic semiconductors, along with one organic polymer, and PTCDA. From this Table, $n_2$ of PTCDA is one of the highest observed to date. However, the response time ($\tau$) is comparatively long. To reduce the carrier lifetime for high speed applications, organic multiple-quantum-well structures are useful. In such structures, recombination of free carriers is enhanced at material interfaces. Hence, the charges incident on the edges of the quantum wells will tend to recombine quickly there. Organic multiple-quantum-well structures are known for organic semiconductors; see, e.g., F. F. So et. al., *Applied Physics Letters*, Vol. 56, No. 7, pp. 674-676 (Feb. 12, 1990). Alternatively, one can reduce $\tau$ by electrically injecting holes from contacts, and then sweep them out using an applied electric field. If positive and negative charges exist for some time in a material, they can be swept to the contacts more rapidly by an applied electric field $\epsilon$ via $$v = \mu\epsilon,$$

wherein $v$ is the velocity and $\mu$ is the carrier mobility in the material.

TABLE I

Resonant Non-Linear Properties of Some Typical Materials Compared to PTCDA.

| Material | Energy Gap, (eV) | λ (μm) | Response Time | Temp. (K) | n$_2$ (cm²/W) |
|---|---|---|---|---|---|
| InSb | 0.18 | 5.5 | 0.3 μs | 80 | 10$^{-3}$ |
| InAs | 0.40 | 3.1 | 0.2 μs | 80 | 2 × 10$^{-5}$ |
| Si | 1.12 | 1.06 | — | 300 | 1.2 × 10$^{-10}$ |
| GaAs | 1.42 | 0.81 | 30 ps | 80 | 8.6 × 10$^{-10}$ |
| SINC[a] | | 0.81 | — | 300 | 10$^{-7}$ |
| PTCDA | 2.2 | 0.514 | 16 μs | 295 | 5.4 × 10$^{-5}$ |

[a]SINC is silicon naphthalocyanine oligomer, which is a random glassy polymer.

Organic aromatic semiconductor compounds having a value of $n_2$ of $>10^{-6}$ cm²/W at room temperature are considered to be useful in the practice of the invention. As indicated earlier, planar polyacenes having at least four fused benzene rings are preferably employed.

Other optical devices may also be fabricated in accordance with the invention. Examples include directional couplers and switches, which, for the purposes of this invention, are also considered to modulate light.

A directional coupler typically consists of a pair of parallel channel (rib) waveguides with a gap between them. The gap width and the refractive index discontinuity between the guides and the gap are small enough to allow the guided light to couple from one waveguide to the other by the overlapping evanescent tails of the guided modes. If the two guides are identical as is generally the case, the coupling coefficients from guide 1 to guide 2 and from guide 2 to guide 1 are identical. Using coupled-mode equations and assuming that a guided mode is initially excited by coupling the incident light beam into guide 2 at z=0, the light power distribution in the two guides is given by $$P_1(z) = P_0 \frac{\kappa^2}{\kappa^2 + \delta^2} \sin^2[(\kappa^2 + \delta^2)^{\frac{1}{2}} z] \quad (4)$$

$$P_2(z) = P_0 - P_1(z),$$

Here, $P_0$ is the input power to guide 2 at z=0 and $O_1(x)$ and $P_2(z)$ are the guided light powers at z in guides 1 and 2, respectively. Also, $\kappa$ is the coupling coefficient, $\delta=(\mu_1-\mu_2)/2$ is the phase mismatch, and $\mu_1$ and $\mu_2$ are propagation constants in guides 1 and 2, respectively. From Eqn. (4) it is clear that $\kappa$ and $\delta$ determine the coupling length (defined by $\pi/2\delta$ for a complete power transfer) and the device switching characteristics.

For PTCDA, a very large refractive index discontinuity of 1.017 for TE modes exists at the interface between the guide and air gap at $\lambda=1.06$ μm. Because of the small mode overlap caused by the large index discontinuity, light energy is strongly confined in the guides, resulting in a small coupling coefficient and a long coupling length. As an example of a PTCDA directional coupler having 0.5 μm thick, 2 μm wide rib waveguides and a 1 μm air gap, the coupling coefficient x for the $TE_{OO}$ mode is $\sim 0.013$ mm$^{-1}$, corresponding to a coupling length of $\sim 120$ mm, which is too long for practical purposes. The best way to increase the coupling coefficient between the two rib waveguides is to fill the gap with a layer whose index is only slightly lower than the adjacent guides. In these experiments, AZ 1400 photoresist was used as the index-matching layer material for PTCDA couplers. Here, AZ 1400 photoresist has a relatively high index of 1.61 and low absorption at $\lambda=1.06$ μm. In this case, $\kappa \ominus 0.50$ mm$^{-1}$, which is about 40 times greater than for a PTCDA coupler without an index-matching layer. Correspondingly, the coupling length is only 3.14 mm.

Figure 4:
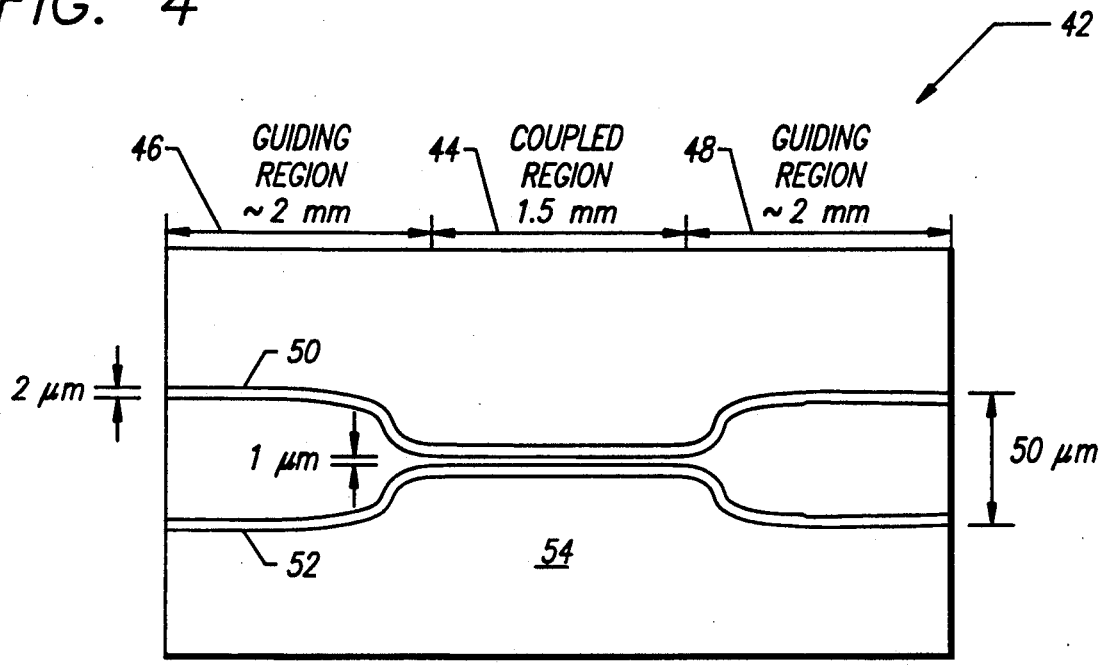
FIG. 4 is a top plan view of a directional coupler employing as the waveguide PTCDA.

A top plan view of a PTCDA directional coupler 42 is shown in FIG. 4. The coupler consists of three regions: a 1.5 mm long coupled region 44 and two $\sim 2$ mm long guiding regions 46, 48. In the coupled region, two 2 μm rib waveguides 50, 52, supported on a substrate 54, are separated by a 1 μm gap. The guiding regions consist of two S-bend waveguides separated by 50 μm at their input and output ends.

To fabricate the directional couplers, a 1 μm thick AZ 1400 photoresist layer was spin-coated onto the cleaned and polished surface of a (100) InP substrate 54. Next, an array of 2 μm wide directional coupler patterns were made onto the photoresist along the (110) direction using conventional photolithographic techniques. A 0.5 to 0.7 μm thick crystalline PTCDA layer was then grown onto the InP substrate and the photoresist pattern surface using the process of organic molecular beam deposition under a $\sim 10^{-7}$ torr base pressure. A deposition rate of $\sim 3$ Å/sec was controlled by heating a prepurified PTCDA source to 450° C., while the substrate temperature was maintained at 90K. Under these conditions, a very smooth waveguide surface and a single crystalline PTCDA layer can be readily obtained, as described by D. Y. Zang et. al., *Applies Physics Letters*, Vol. 59, pp. 823-825 (1991). After PTCDA deposition, a second 1 μm thick AZ 1400 photoresist layer was spun onto the wafer surface to form the index-matching layer. The sample was then baked at 90° C. for one hour. To facilitate end-fire coupling of the optical input beam, the sample was cleaved along the ($\bar{1}10$) direction, forming parallel facets at the PTCDA waveguide ends. According to calculations, the AZ 1400/PTCDA. coupler is expected to have a coupling efficiency of $\sim 46\%$.

Figure 5:
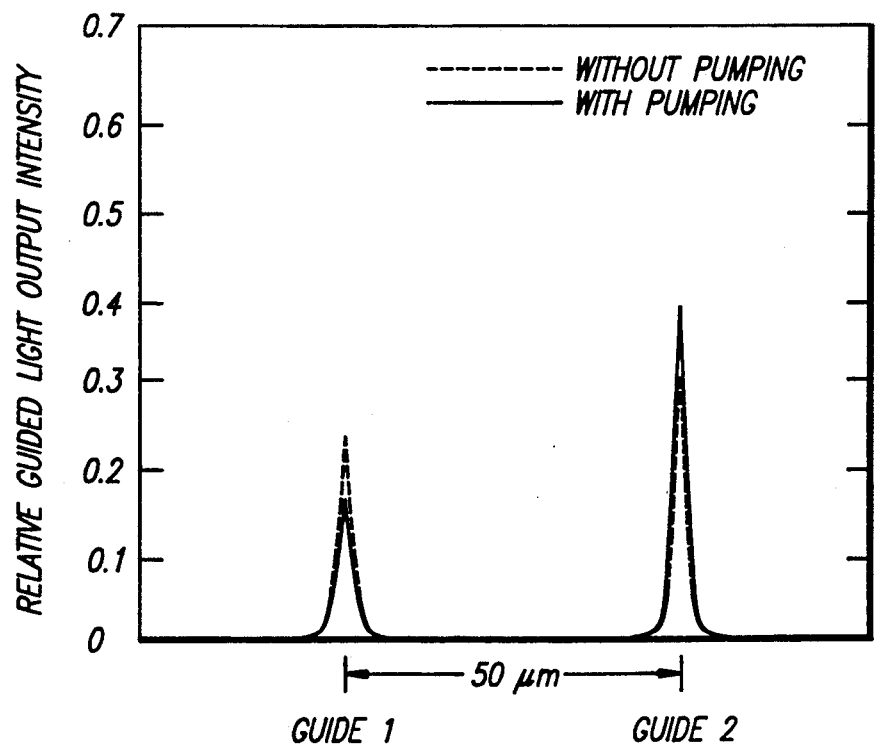
FIG. 5, on coordinates of relative guided light output intensity and waveguide separation distance, is a plot of the output intensity distributions without (dashed lines) and with (solid lines) at 0.514 $\mu$m wavelength pump light beam intensity of $\sim 4$ W/cm$^2$.

To characterize the couplers, a 1.06 μm wavelength light beam from a YAG laser was end-fire coupled into one guide of the coupler to excite the $TE_{OO}$ mode using a microscope objective. Light emerging from the two output guides was remained onto a CCD camera using a second microscope objective. Two $TE_{OO}$ mode beam spots exiting from the coupler are clearly observed, as shown by the intensity profiles in FIG. 5 (dashed lines). The coupling efficiencies measured for several samples ranged from 47 to 37% due to slight variations in the device geometric parameters from coupler to coupler. For example, the coupling efficiency drops from 47 to 36% for an increase in PTCDA thickness from 0.50 to 0.53 μm It has previously been found that the refractive index of PTCDA can be changed by illumination with a pump light $\lambda=0.514$ μm. Using pulsed pump light measurements, the mechanism of the light-induced refractive index change in PTCDA was found to be due to the optical generation of excitons which subsequently dissociate into free electrons and holes, creating a charged plasma. A resonant non-linear coefficient of $n_2=5.4\times 10^{-5}$ cm/W and a carrier lifetime of 17 μsec were measured. This phenomenon has been utilized for observing all-optical switching in the PTCDA directional couplers. For these experiments, the coupler was placed on a copper block mounted on a thermoelectric cooler. Using a thermocouple and a temperature controller, the device temperature was precisely maintained at 21.8° C. Ar-ion laser beam at $\lambda=0.514$ μm was focused by a cylindrical lens to directly illuminate the surface of one arm of the coupler in the coupling region along a $\sim 5000\times 10$ μm line. The 1.06 μm wavelength beam was then end-fire coupled into one branch of the coupler. An infrared filter was placed in front of the CCD camera to block any short wavelength, non-guided light beams.

The change in refractive index in one guide induced by the short wavelength illumination alters the phase mismatch, $\delta$, and the coupling coefficient, $\kappa$, thereby reducing the coupling efficiency. That is, the light energy is switched back into the guide in which the waveguide mode was initially excited. A typical experimental result illustrating the output intensities exiting the two guides with short wavelength pumping is shown by the solid lines in FIG. 5, in which the coupling efficiency was reduced by 8.3% using a pump intensity of $\sim 4$ W/cm$^2$. The incident light beam was coupled into the right hand guide. Comparing the pumped and unpumped output intensities, the output of the left guide decreased by 8.3%, while the output of the right guide increased by 8.3% when the pump was on.

Figure 6:
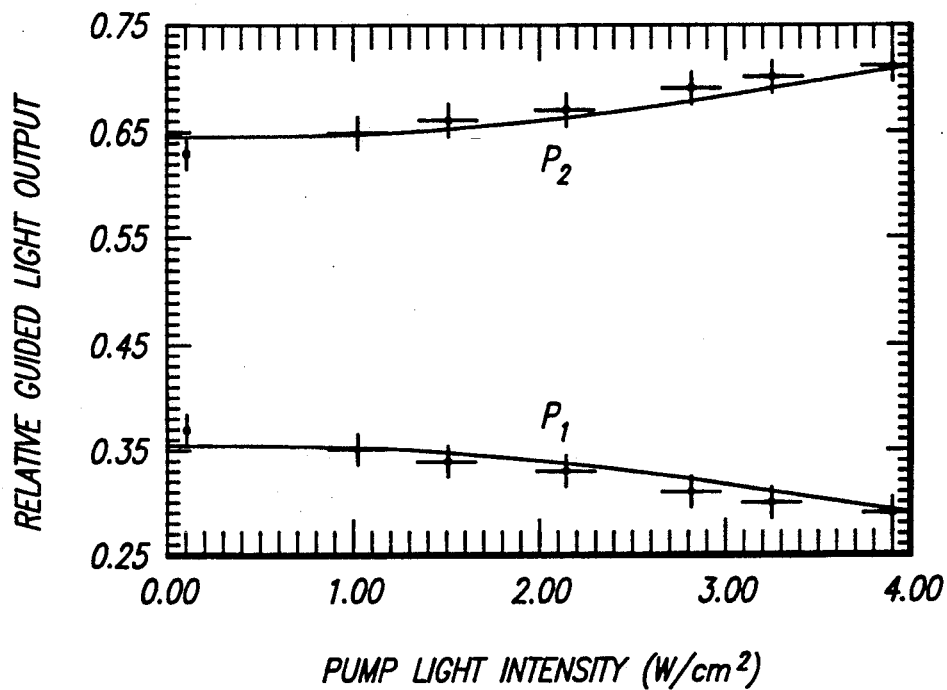
FIG. 6, on coordinates of relative guided light output and pump light intensity, is a plot of the measured relative light outputs (solid circles) from two rib guides of the PTCDA directional coupler of FIG. 4 as a function of 0.514 $\mu$m wavelength pump light intensity.

FIG. 6 shows the measured relative output intensities from the two guides as a function of pump light intensity, together with the theoretical calculation. The calculation was based on Eqn. (4) in which the coupling coefficient x and the phase mismatch $\delta$ have an implicit dependence on the pump light intensity through the change of refractive index in PTCDA. The parameters used in the calculation are as follows: 2.5 μm rib width, 0.82 μm gap, and 0.78 μm waveguide thickness, which are close to the SEM measurements. A resonant non-linear coefficient of $n_2 = 5.4 \times 10^{-5}$ cm$^2$/W was also assumed, based on the publication by D. Y. Zang et. al., *Applied Physics Letters*, Vol. 59, pp. 823-825 (1991), cited above. From FIG. 6, it is clearly seen that the measured data are in reasonable agreement with the calculation.

Thus, the foregoing describes the fabrication of a crystalline organic directional coupler with an index-matching layer grown by the high vacuum process of organic molecular beam deposition. The index-matching layer greatly reduces the coupling length, making the coupler compact. All-optical switching between two arms of the coupler was also observed, using wavelengths of 1.06 and 0.514 μm as the guided and pump light beams, respectively. The measured values of coupling efficiency versus pump intensity are in agreement with theoretical prediction. This appears to be the first reported observation of a directional coupler and a coupler switch using crystalline organic semiconductors.

In conclusion, the apparently first observation of free-carrier-induced non-linear effects in crystalline organic semiconductors has been disclosed herein. An intensity-dependent resonant non-linear coefficient of $n_2 = 5.4 \times 10^{-5}$ cm$^2$/W has been measured, and is among the highest values reported for practical optical device materials.

INDUSTRIAL APPLICABILITY

The use of a planar crystalline organic aromatic semicompound, such as 3,4,9,10-perylenetetracarboxylic dianhydride, as a waveguide is expected to find use in all-optical modulator devices.

Thus, there has been disclosed an all-optical modulator device which includes a planar crystalline organic aromatic semiconductor compound. It will be appreciated by those skilled in this art that various changes and modifications of an obvious nature may be made without departing from the spirit of the invention, and all such changes and modifications are considered to fall within the scope of the invention, as defined by the appended claims.

What is claimed is:

1. An improved method of modulating light in at least one waveguide, comprising:
   (a) providing said at least one waveguide;
   (b) introducing light from a first source into said waveguide;
   (c) introducing light from a second source at an angle to said waveguide to cause modulation of said light from said first source,
wherein the improvement comprises fabricating said waveguide from a crystalline organic aromatic semiconductor compound having a resonant non-linear coefficient of at least $10^{-6}$ cm$^{-2}$/W at room temperature and grown in a quasi-epitaxial structure.

2. The method of claim 1 wherein said crystalline organic aromatic semiconductor compound comprises a polyacene compound having at least two fused benzene rings.

3. The method of claim 2 wherein said crystalline organic aromatic semiconductor compound is planar.

4. The method of claim 3 wherein said crystalline organic aromatic semiconductor compound comprises 3,4,9,10-perylenetetracarboxylic dianhydride.

5. The method of claim 1 wherein said light from said first source has a wavelength of about 1.06 μm.

6. The method of claim 1 wherein said light from said source has a wavelength of about 0.514 μm.

7. The method of claim 1 wherein said waveguide is formed in the shape of a strip having a substantially rectangular cross-section and having faceted ends suitable for waveguiding light, with light from said first source introduced into one of said faceted ends and with light from said second source introduced orthogonal thereto.

8. The method of claim 7 wherein light from said second source is introduced onto the top of said waveguide.

9. The method of claim 1 wherein light is modulated in a directional coupler switch comprising two waveguides supported on a substrate, said directional coupler comprising (a) a coupled region in which said two waveguides are separated by a first distance and (b) two guiding regions on either side of said coupled region in which said two waveguides are separated by a second distance, said second distance greater than said first distance, said first distance having a value to permit switching of light from one waveguide to the other.

10. The method of claim 9 wherein light from said first source is introduced into a first of said waveguides and light from said second source is introduced onto the top of at least said first waveguide, with light from said second source causing light in said first waveguide to switch into the other waveguide.

11. The method of claim 1 wherein said organic semiconductor compound has a carrier lifetime that is reduced by forming said compound in a multiple-quantum-well structure.

12. The method of claim 1 wherein said organic semiconductor compound has a carrier lifetime that is reduced by electrically injecting holes therein from a contact, and then sweeping them out using an applied electric field.

13. An improved method of modulating light in at least one waveguide, comprising:
   (a) providing said at least one waveguide;
   (b) introducing light from a first source into said waveguide;
   (c) introducing light from a second source at an angle to said waveguide to cause modulation of said light from said first source,
wherein the improvement comprises fabricating said waveguide from a planar stacking crystalline organic aromatic semiconductor compound having a resonant non-linear coefficient of at least $10^{-5}$ cm$^2$/W at room temperature and grown in a quasi-epitaxial structure.

14. The method of claim 13 wherein said crystalline organic aromatic semiconductor compound comprises a polyacene compound having four fused benzene rings.

15. The method of claim 14 wherein said crystalline organic aromatic semiconductor compound comprises 3,4,9,10-perylenetetracarboxylic dianhydride.

16. The method of claim 13 wherein said light from said first source has a wavelength of about 1.06 μm.

17. The method of claim 13 wherein said light from said second source has a wavelength of about 0.514 μm.

* * * * *